United States Patent
Okada et al.

(10) Patent No.: US 12,038,648 B2
(45) Date of Patent: Jul. 16, 2024

(54) ILLUMINATION DEVICE AND DISPLAY DEVICE

(71) Applicant: Japan Display Inc., Tokyo (JP)

(72) Inventors: Masafumi Okada, Tokyo (JP); Shinichi Komura, Tokyo (JP); Ken Onoda, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/342,841

(22) Filed: Jun. 28, 2023

(65) Prior Publication Data

US 2024/0004238 A1 Jan. 4, 2024

(30) Foreign Application Priority Data

Jun. 30, 2022 (JP) .................... 2022-106145

(51) Int. Cl.
*G02F 1/13357* (2006.01)
*G02F 1/1335* (2006.01)

(52) U.S. Cl.
CPC .. *G02F 1/133621* (2013.01); *G02F 1/133609* (2013.01); *G02F 1/133613* (2021.01); *G02F 1/133603* (2013.01)

(58) Field of Classification Search
CPC ............ G02B 6/0068; G02F 1/133621; G02F 1/133613; G02F 1/133609; G02F 1/133603
See application file for complete search history.

(56) References Cited

U.S. PATENT DOCUMENTS

| | | | | |
|---|---|---|---|---|
| 2003/0043567 | A1* | 3/2003 | Hoelen | G02B 6/0068 362/613 |
| 2008/0310153 | A1* | 12/2008 | Hamada | G02B 6/0085 362/231 |
| 2009/0279284 | A1* | 11/2009 | Takeuchi | G02B 6/0068 362/97.3 |

FOREIGN PATENT DOCUMENTS

| | | |
|---|---|---|
| JP | 2006-066338 A | 3/2006 |
| JP | 2019-124834 A | 7/2019 |

* cited by examiner

*Primary Examiner* — Thomas M Sember
(74) *Attorney, Agent, or Firm* — Michael Best & Friedrich LLP

(57) ABSTRACT

According to one embodiment, an illumination device includes red light emitting elements, green light emitting elements and blue light emitting elements opposing a first side surface of a first light guide, and the red light emitting elements, the green light emitting elements and the blue light emitting elements are disposed along the first side surface in a third direction that intersects the first direction and the second direction, and, arranged to be symmetrical with respect to a central axis of the third direction of the first side surface.

14 Claims, 10 Drawing Sheets

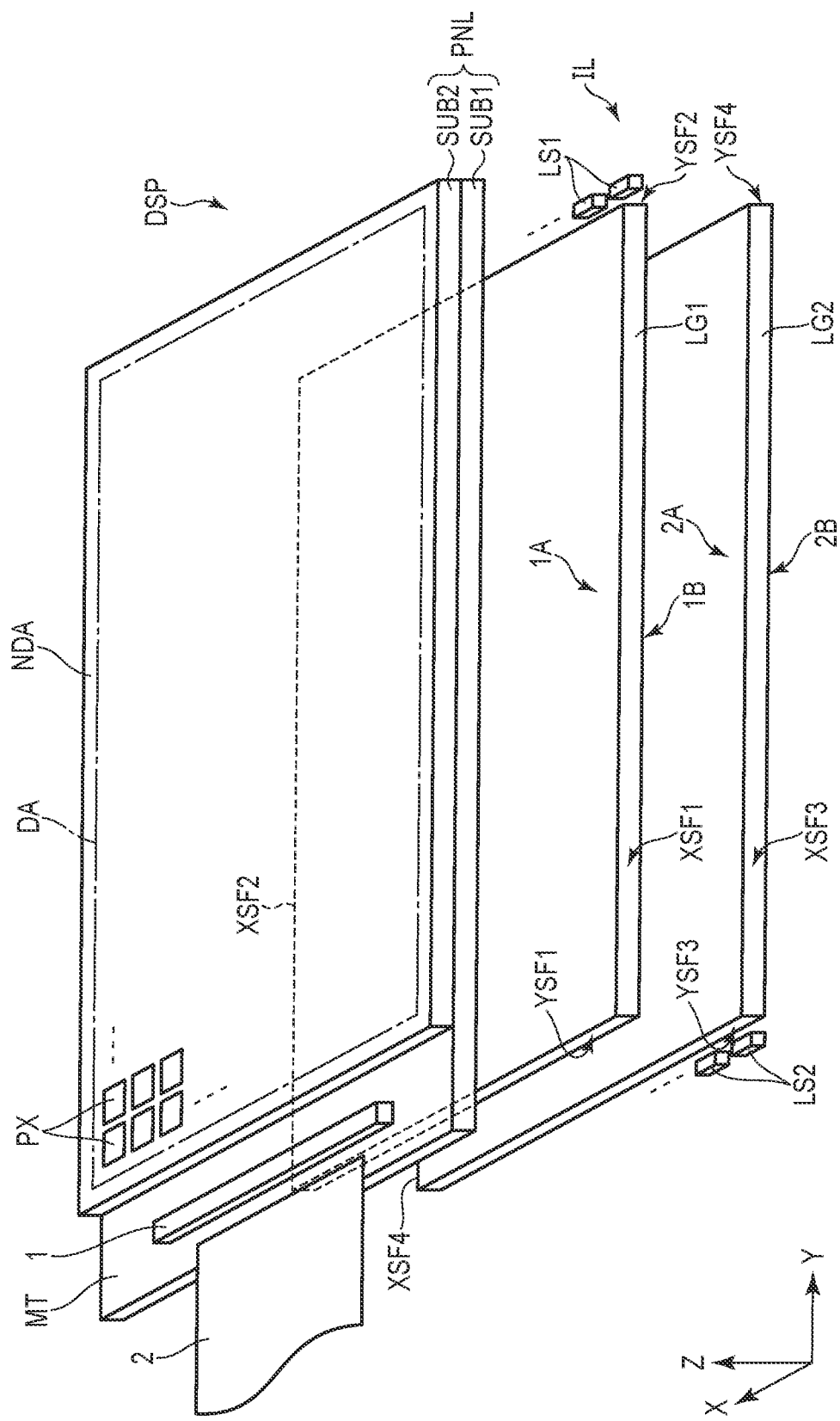
F I G. 1

| Color | Dominant: λD | Radiation amount of light output: Po | Single light output: Fo | Number | Saturation temperature coefficient | Total saturated color light output | White color mixing ratio | Adjusted total color light output | Total light output |
|---|---|---|---|---|---|---|---|---|---|
| Red | 638nm | 700mW | 91.39lm | 2 | 0.6 | 109.7lm | 3 | 109.7lm(3) | 402.2lm |
| Green | 530nm | 1000mW | 588.75lm | 2 | 0.8 | 942.0lm | 7 | 255.9lm(7) | |
| Blue | 467nm | 1400mW | 76.75lm | 2 | 0.95 | 145.8lm | 1 | 36.6lm(1) | |

F I G. 7

| Color | Single light output : Fo | Number | Total color light output : Fo | Saturation temperature coefficient | Total saturated color light output | White color mixing ratio | Light output ratio | Adjusted total color light output | Total light output |
|---|---|---|---|---|---|---|---|---|---|
| Red | 91.39lm | 3 | 247.17lm | 0.6 | 164.5lm | 3 | 1.1 | 164.5lm(3) | 603lm |
| Green | 588.75lm | 2 | 1177.5lm | 0.8 | 942.0lm | 7 | 6.5 | 383.8lm(7) | |
| Blue | 76.75lm | 2 | 153.5lm | 0.95 | 145.8lm | 1 | 1 | 54.8lm(1) | |

FIG. 9

| Color | Single light output: Fo | Number | Total color light output: Fo | Saturation temperature coefficient | Total saturated color light output | White color mixing ratio | Light output ratio | Adjusted total color light output | Total light output |
|---|---|---|---|---|---|---|---|---|---|
| Red | 91.39lm | 4 | 365.56lm | 0.6 | 219.3lm | 3 | 3.0 | 219.3lm(3) | |
| Green | 588.75lm | 2 | 1177.5lm | 0.8 | 942.0lm | 7 | 12.9 | 510.5lm(7) | 802.7lm |
| Blue | 76.75lm | 1 | 76.75lm | 0.95 | 72.9lm | 1 | 1 | 72.9lm(1) | |

F I G. 11

ILLUMINATION DEVICE AND DISPLAY DEVICE

CROSS-REFERENCE TO RELATED APPLICATIONS

This application is based upon and claims the benefit of priority from Japanese Patent Application No. 2022-106145 filed Jun. 30, 2022, the entire contents of which are incorporated herein by reference.

FIELD

Embodiments described herein relate generally to an illumination device and a display device.

BACKGROUND

Display devices, for example, liquid crystal display devices or the like, comprise a display panel including pixels and an illumination device such as a backlight, which illuminates the display panel. The illumination device comprises has a light source which emits light and a light guide to which the light from the light source is irradiated. Light from the light source enters the light guide from a side surface, propagates through the light guide, and exits from an emission surface corresponding to one of the main surfaces of the light guide.

In order to enlarge the color reproducible area, such a display device includes monochromatic light sources of red, green, and blue each having a single wavelength, and adjusts a white color by additive color mixing. In the display device, the light sources, each of which is a combination of light emitting elements of red, green and blue, are aligned along a side surface of the light guide. But, when light sources each being a combination of red, green, and blue light emitting elements are aligned along the side surface of the light guide, there are possibilities that the color mixing may not create white color, causing color breakup and further uniform luminance cannot be achieved.

BRIEF DESCRIPTION OF THE DRAWINGS

FIG. 1 is an exploded perspective view showing schematically showing a configuration example of a display device according to an embodiment.

FIG. 7 is a diagram showing an example of a table of parameters of a red light emitting element, a green light emitting element and a blue light emitting element in the case where white color mixing is carried out at an operation saturation temperature in the configuration of the light source according to the comparative example illustrated in FIG. 6.

FIG. 9 is a diagram showing an example of a table of parameters of a red light emitting element, a green light emitting element and a blue light emitting element in the case where white color mixing is carried out at an operation saturation temperature in the configuration of the light source according to this embodiment shown in FIG. 6.

FIG. 11 shows an example of a table of parameters for red, green, and blue light-emitting elements in the case of white color mixing at the operation saturation temperature in the configuration of the light source for this embodiment shown in FIG. 10.

DETAILED DESCRIPTION

Figure 2:
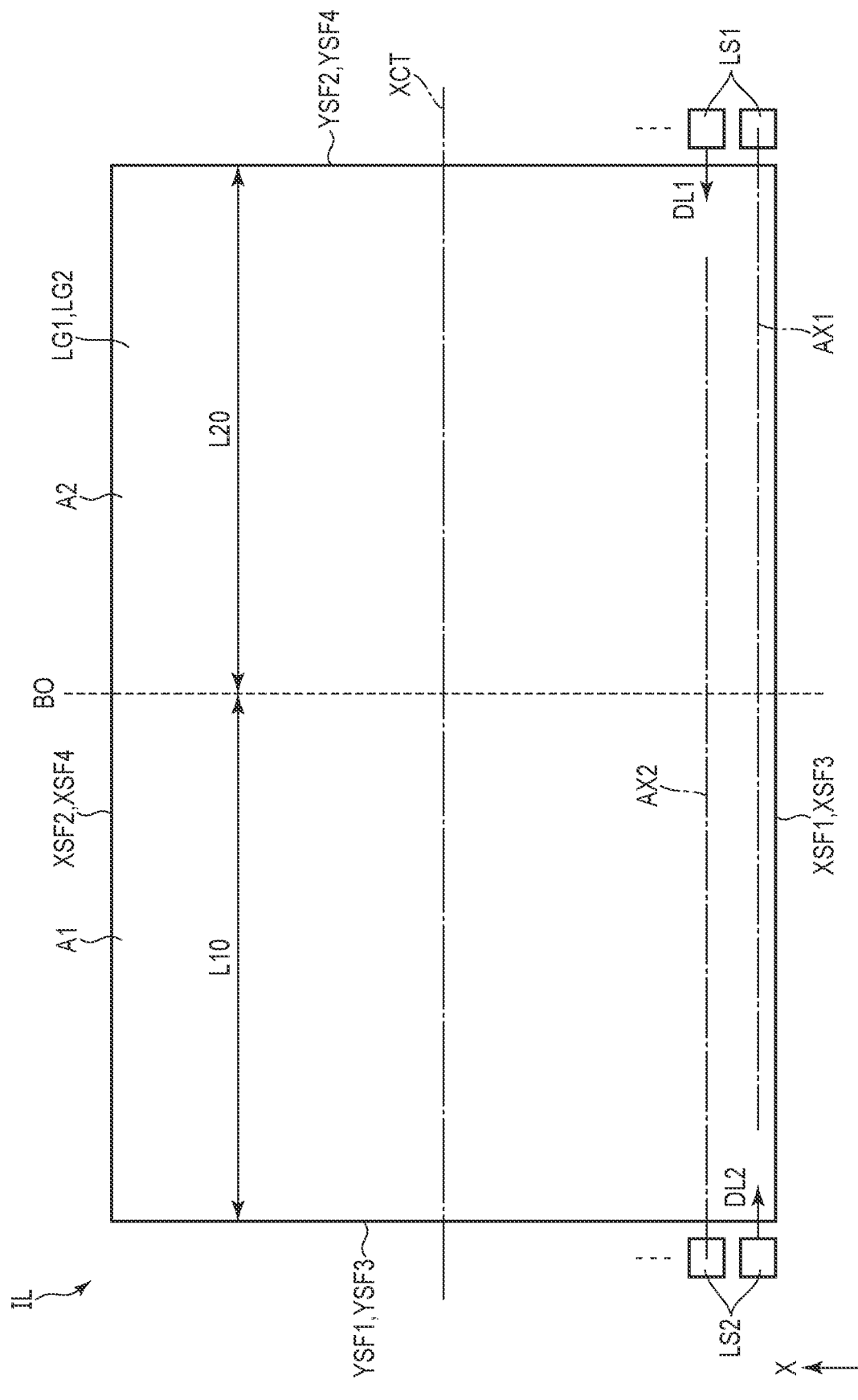
FIG. 2 is a plan view showing an illumination device shown in FIG. 1.

In general, according to one embodiment, an illumination device comprises a first light guide including a first side surface, a second side surface located on an opposite side to the first side surface in a first direction, a first main surface, and a first opposing surface located on an opposite side to the first main surface in a second direction intersecting the first direction; red light emitting elements, green light emitting elements and blue light emitting elements opposing the first side surface, wherein the red light emitting elements, the green light emitting elements and the blue light emitting elements are disposed along the first side surface in a third direction that intersects the first direction and the second direction, and arranged to be symmetrical with respect to a central axis of the third direction of the first side surface.

According to another embodiment, a display device comprises an illumination device; and a display panel for displaying images, the illumination device comprising: a first light guide including a first side surface, a second side surface located on an opposite side to the first side surface in a first direction, a first main surface, and a first opposing surface located on an opposite side to the first main surface in a second direction intersecting the first direction, and red light emitting elements, green light emitting elements and blue light emitting elements opposing the first side surface, wherein the red light emitting elements, the green light emitting elements and the blue light emitting elements are disposed along the first side surface in a third direction that intersects the first direction and the second direction, and arranged to be symmetrical with respect to a central axis of the third direction of the first side surface, and the display panel opposing the first main surface.

An object of the embodiments is to provide an illumination device with an improved uniformity in white color chromaticity and improved light output when white color mixing, and such a display device.

The embodiments described herein are not general ones, but rather embodiments that illustrate the same or corresponding special technical features of the invention. The following is a detailed description of one embodiment of a display device with reference to the drawings.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

In the embodiments, a transmissive liquid crystal liquid crystal display device is described as an example of the display device DSP. Further, an illumination device used as a backlight for a transmissive liquid crystal liquid crystal display device is described as an example of the illumination device. The major configuration explained in the present embodiments can as well be applied to a liquid crystal display device having a reflective function, which utilizes for display reflection light obtained by reflecting external light, in addition to the transmissive function, an electronic paper display device comprising a cataphoretic element, and the like, a display device employing micro-electromechanical systems (MEMS), or a display device employing electrochromism. Further, the major configuration explained in the present embodiments can as well be applied to illumination devices to be employed for the usage of other than the backlight.

Embodiment

FIG. 1 is an exploded schematic view of a configuration example of the display device DSP. FIG. 1 illustrates a direction X (a third direction), a direction Y (a first direction) and a direction Z (a second direction). The direction X, direction Y and direction Z are orthogonal to each other, but may intersect at an angle other than 90 degrees. The direction X and the direction Y correspond to a direction parallel to the main surface of the substrate constitute the liquid crystal display device (which may as well be simply referred to as "display device" hereinafter) DSP, and the direction Z corresponds to the direction of thickness of the display device DSP. In this specification, the direction from the first substrate SUB1 towards the second substrate SUB2 is referred to as "upward side" (or simply above), and the direction from the second substrate SUB2 towards the first substrate SUB1 is referred to as "downward" (or simply below). With such expressions "a second layer above a first layer" and "a second layer below a first layer", the second layer may be in contact with the first layer or may be remote from the first layer. In addition, it is assumed that there is an observation position to observe the display device SDP on a tip side of an arrow in the third direction Z, and viewing from this observation position toward the X-Y plane defined by the first direction X and the second direction Y is referred to as a plan view. An X-Z plane is defined by the direction X and the direction Z. A Y-Z plane is defined by the direction Y and the direction Z. The "length in the direction X and the direction Y of a given substance, object or region" may be referred to as "width" and the "length in the third direction of a given substance, object, or region may be referred to as "thickness" or "height".

The display device DSP comprises a display panel PNL, an illumination device IL, an IC chip 1 and a wiring board 2.

The display panel PNL comprises a first substrate SUB1 and a second substrate SUB2. The first substrate SUB1 and the second substrate SUB2 face each other. Between each substrate SUB1 and SUB2, a display functional layer (in this embodiment, the liquid crystal layer LC described below) is provided. The display panel PNL has a display area DA and a non-display area NDA. The display area DA is an area for displaying images. The display area DA is located approximately in the center of the area where the first substrate SUB1 and the second substrate SUB2 face each other. The non-display area NDA is the area where no image is displayed and is located outside the display area DA. The display panel PNL, for example, has a plurality of pixels PX arranged in a matrix in the display area DA.

The IC chip 1 and the wiring board 2 function mainly as a signal source that supplies signals to the display panel PNL, though it may, in some cases, read out signals from the display panel PNL. The IC chip 1 and the wiring board 2 are located in the non-display area NDA. In the example illustrated in FIG. 1, the IC chip 1 and the wiring board 2 are mounted on a mounting area MT of the second substrate SUB1 that extends outward from one side edge (or in some cases referred to as an end portion) of the second substrate SUB2. The wiring board 2 is, for example, a bendable flexible printed circuit board. Note that the IC chip 1 may as well be provided on the wiring board 2.

The illumination device IL illuminates the display panel PNL. The illumination device IL comprises a light guide LG1, a light guide LG2, a plurality of light sources (or light emitting elements) LS1, and a plurality of light sources (or light emitting elements) LS2. The light guide LG2, the light guide LG1, the first substrate SUB1 and the second substrate SUB2 are arranged toward the tip of the arrow in the direction Z in the order mentioned.

The light guide LG1 is an insulating substrate such as a glass substrate or a plastic substrate. The light guide LG1 is formed of a substrate made of a material containing acrylic resin, that is, for example, an acrylic substrate. The light guide LG1 is formed into a flat plate parallel to the X-Y plane. The light guide LG1 includes a main surface 1A opposing the display panel PNL, an opposing surface 1B located on an opposite side to the main surface 1A in the direction Z, a side surface YSF1 along the direction Y, a side surface YSF2 located on an opposite side to the side surface YSF1 in the direction Y and a side surface XSF2 located on an opposite side to the side surface XSF1 in the direction X. The main surface 1A and the opposing surface 1B are parallel to the X-Y plane, for example. The side surface YSF1 and the side surface YSF2 oppose each other along the direction Y and parallel to the X-Z plane, for example. The side surface XSF1 and the side surface XSF2 oppose each other along the direction X and parallel to the Y-Z plane, for example.

The light source LS1 includes a plurality of light sources (or light emitting elements) LS1. The light sources (or the light emitting elements) LS1 are arranged to be spaced apart from each other along the direction X. Each light source (or each light emitting element) LS1 opposes the side surface YSF2.

The light guide LG2 is an insulating substrate such as a glass substrate or a plastic substrate. The light guide LG2 is formed of the same material as that of the light guide LG1, for example. Note that the light guide LG2 need not be formed of the same material as that of the light guide LG1. The light guide LG2 is formed of a substrate made of a material containing acrylic resin, that is, for example, an acrylic substrate. The light guide LG2 is formed into a flat plate parallel to the X-Y plane. The light guide LG2 includes a main surface 2A opposing the main surface 1B, an opposing surface 2B located on an opposite side to the main surface 2A in the direction Z, a side surface YSF3 aligned with the side surface YSF1 along the direction Z, a side surface YSF4 located on an opposite side to the side surface YSF3 in the direction Y and aligned with the side surface YSF2 along the direction Z, a side surface XSF3 aligned with the side surface XSF1 along the direction Z and a side surface XSF4 located on an opposite side to the side surface XSF3 in the direction X and aligned with side surface XSF2 along the direction Z. The main surface 2A and the opposing surface 2B are parallel to the X-Y plane, for example. The side surface YSF3 and the side surface YSF4 oppose each other along the direction Y and parallel to the X-Z plane, for example. The side surface XSF3 and the side surface XSF4 oppose each other along the direction X and parallel to the Y-Z plane, for example.

The light source LS2 includes a plurality of light sources (or light emitting elements) LS2. The light sources (or the light emitting elements) LS2 are arranged to be spaced apart from each other along the direction X. Each light source (or each light emitting element) LS2 opposes the side surface YSF3.

The light source (or light emitting element) LS1 and the light source (or light emitting element) LS2 are, for example, respectively, light sources each of a single wavelength type. The light source (or light emitting element) LS1 and the light source (or light emitting element) LS2 are laser beam sources such as semiconductor lasers that emit polarized laser beams, that is, for example, laser diodes or light emitting diodes. For example, the light source (or light emitting element) LS1 and the light source (or light emitting element) LS2 should preferably be laser diodes with high color purity in order to increase the color reproducibility area. The light source (or light emitting element) LS1 and the light source (or light emitting element) LS2 have the same configuration. Note that the light source (or light emitting element) LS1 and the light source (or light emitting element) LS2 may as well have configurations different from each other.

The light source LS1 and the light source LS2 may comprise a plurality of light emitting elements that emit light of different colors. For example, the light source LS1 and the light source LS2 each may include three light emitting elements that emit red, green and blue light, respectively. When the light source LS1 and the light source LS2 each include three light emitting elements respectively emitting red, green and blue light, for example, a mixed-color (for example, white) light can be obtained by adjusting these light components through additive color mixing. Hereinafter, the "light-emitting element of red color light" may as well be referred to as "red light emitting element", "light-emitting element of green color light" may as well be referred to as "green light emitting element" and "light-emitting element of blue color light" may as well be referred to as "blue light emitting element". Note that the light source LS1 and the light source LS2 each may include elements of colors other than red, blue or green. Further, the operation of "adjusting the light emitted from the display device and the illumination device to white by adjusting the emission condition of the light emitting elements of each color through additive color mixing" may as well be referred to as "white color mixing (white balancing)" or "white color adjusting".

FIG. 2 is a plan view of the illumination device IL shown in FIG. 1. As shown in FIG. 2, the illumination device IL includes a first area A1, a second area A2, a boundary BO between the first area A1 and the second area A2 and a central axis XCT of a width along the direction X. The first area A1 has a length L10 along the direction Y and the second area A2 has a length L20 along the direction Y. The length L10 and the length L20 are substantially the same as each other. Note that the length L10 and the length L20 need not be the same. The terms "same", "identical", "equivalent" and "coincident" cover not only the cases where physical quantities, materials, compositions (structures) or the like of a plurality of target objects, spaces, areas, etc., are completely the same as each other, but also such cases where they may be slightly different to a degree that they appear to be substantially the same. In the example illustrated in FIG. 2, the light guide LG1 and the light guide LG2 are located in the entire region of the first area A1 and the entire region of the second area A2, respectively. In other words, the main surface 1A, the opposing surface 1B, the main surface 2A and the opposing surface 2B shown in FIG. 2 are located in the first area A1 and the second area A2, respectively.

In the example illustrated in FIG. 2, the light guide LG1 and the light guide LG2 overlap each other. Note that the light guide LG1 and the light guide LG2 may be displaced from each other. The side surface YSF1 and the side surface YSF3 are located in the area A1, and the side surface YSF2 and the side surface YSF4 are located in the area A2. The side surface YSF1 and the side surface YSF3 overlap each other in plan view, and the side surface YSF2 and the side surface YSF4 overlap each other in plan view. The side surface XFS1 and the side surface XSF3 overlap each other in plan view, and the side surface XSF2 and the side surface XSF4 overlap each other in plan view. The boundary BO corresponds to a middle of the interval between the side surface YSF1 and the side surface YSF2 and also to a middle of the interval between the side surface YSF3 and the side surface YSF4. Note that the middle of the interval between the side surface YSF1 and the side surface YSF2 and the middle of the interval between the side surface YSF3 and the side surface YSF4 may be displaced from each other. The central axis XCT corresponds to a middle of the interval between the side surface XSF1 and the side surface XSF2 and also to a middle of the interval between the side surface XSF3 and the side surface XSF4. The central axis XCT may be displace from the middle of the interval between the side surface XSF1 and the side surface XSF2, and the middle of the interval between the side surface XSF3 and the side surface XSF4.

The light source LS1 emits light in a light emission direction DL1 toward the side surface YSF2. The intensity of the light emitted by the light source LS1 is the highest at the optical axis AX1, and the light emission direction DL1 is parallel to the optical axis AX1. The light source LS2 emits light in a light emission direction DL2 toward the side surface YSF3. The intensity of the light emitted by the light source LS2 is the highest at the optical axis AX2, and the light emission direction DL2 is parallel to the optical axis AX2.

Figure 3:
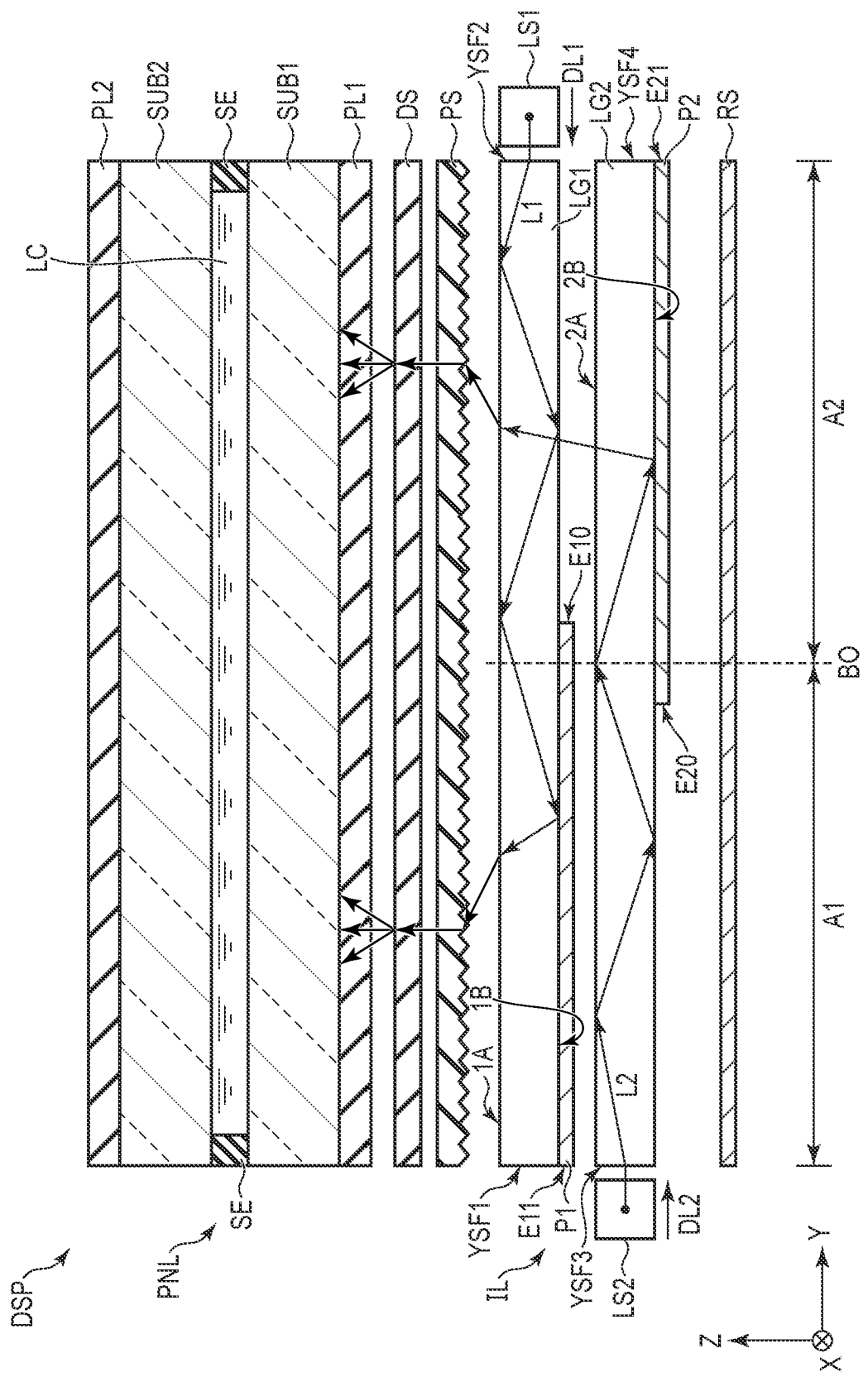
FIG. 3 is a cross-sectional view showing the display device shown in FIG. 1.

FIG. 3 is a cross-sectional view of the display device DSP shown in FIG. 1. As shown in FIG. 3, the display panel PNL further comprises a liquid crystal layer LC, a seal SE, a polarizer PL1 and a polarizer PL2.

The liquid crystal layer LC and the seal SE are located between the first substrate SUB1 and the second substrate SUB2. The seal SE adheres the first substrate SUB1 and the second substrate SUB2 together and also seals the liquid crystal layer LC between the first substrate SUB1 and the second substrate SUB2.

The polarizer PL1 is adhered to a lower surface of the first substrate SUB1. The polarizer PL2 is adhered to an upper surface of the second substrate SUB2. The polarization axes of the polarizer PL1 and the polarizer PL2 are, for example, orthogonal to each other.

The illumination device IL further comprises a reflective layer P1, a reflective layer P2, a diffusion sheet DS, a prism sheet PS and a reflective sheet RS. Note that a plurality of, for example, two prism sheets PS may be provided to overlap each other along the direction Z.

The diffusion sheet DS is located between the display panel PNL and the light guide LG1. The diffusion sheet DS diffuses light incident on the diffusion sheet DS to uniform the luminance of the light. The prism sheet PS is located between the diffusion sheet DS and the light guide LG1. The prism sheet PS focuses the light emitted from the main surface 1A of the light guide LG1 in the direction Z, for example. The prism sheet PS is constituted by a plurality of prisms arranged continuously along in the direction Y. The plurality of prisms of the prism sheet PS protrude toward the main surface 1A in the direction Z. The prisms of the prism sheet PS have a triangular shape in cross-section parallel to the Y-Z plane. The shapes of the prisms of the prism sheet PS, in cross-section parallel to the Y-Z plane, are similar in relation to each other. Hereafter, the base angle of a prism of the prism sheet PS may as well be referred to as an inverted prism base angle. The reflective sheet RS opposes the main surface 2B of the light guide LG2. The reflective sheet RS reflects light leaking from within the light guide LG2 and guide it to re-enter the light guide LG2, for example.

The reflective layer P1 and the reflective layer P2 are layers each including a plurality of prisms, which will be described later. The reflective layer P1 is located on the opposing surface 1B. The reflective layer P1 extends from the first area A1 over the boundary BO to between the boundary BO and the side surface YSF2.

The reflective layer P1 includes an end portion E10 and an end portion E11 on an opposite side to the end portion E10. The end portion E10 is located between the boundary BO and the side surface YSF2 and is proximate to the boundary BO. The end portion E11 is proximate to the side surface YSF1. For example, the end portion E10 corresponds to the position of the prism closest to the side surface YSF2 among the plurality of prisms (prisms PA to be described later) contained in the reflective layer P1. For example, the end portion E11 corresponds to the position of the prism closest to the side surface YSF1 among the plurality of prisms (prisms PA to be described below) contained in the reflective layer P1.

The reflective layer P2 is located on the main surface 2B. The reflective layer P2 extends from the second area A2 over the boundary BO to between the boundary BO and the side surface YSF3.

The reflective layer P2 includes an end portion E20 and an end portion E21 on an opposite side to the end portion E20. The end portion E20 is located between the boundary BO and the side surface YSF3 and is proximate to the boundary BO. The end portion E21 is proximate to the side surface YSF4. For example, the end portion E20 corresponds to the position of the prism closest to the side surface YSF3 among the plurality of prisms (prisms PB to be described later) contained in the reflective layer P2. For example, the end portion E21 corresponds to the position of the prism closest to the side surface YSF4 among the plurality of prisms (prisms PB to be described below) contained in the reflective layer P2.

The reflective layer P1 and the reflective layer P2 overlap each other along the direction Z on the boundary BO and in the vicinity of the boundary BO.

The light source LS1 is located away from the side surface YSF2. The light emission direction DL1 of the light source LS1 is parallel to the normal direction of the side surface YSF2. Note that the light emission direction DL1 of the light source LS1 may intersect the normal direction of the side surface YSF2. The light source LS2 is located away from the side surface YSF3. The light emission direction DL2 of the light source LS2 is parallel to the normal direction of the side surface YSF3. The light emission direction DL2 of the light source LS2 may intersect the normal direction of the side surface YSF3.

Light L1 emitted from the light source LS1 is refracted by the side surface YSF2 and enters the light guide LG1. Of the light L1 incident on the light guide LG1, light traveling toward the main surface 1A is reflected at the interface between the light guide LG1 and the air layer. Of the light L1 incident on the light guide LG1, light traveling toward the opposing surface 1B is reflected at the interface between the light guide LG1 and the air layer. Thus, the light L1 travels in the light guide LG1 while being repeatedly reflected in the area of the second area A2, where the reflective layer P1 is not provided.

Of the light L1 traveling in the light guide LG1, the light traveling from the light guide LG1 toward the reflection layer P1 is redirected in terms of its travelling direction by the prisms in the reflection layer P1 and emitted from the main surface 1A without being in the state of the total reflection condition of the main surface 1A. The light emitted from the main surface 1A illuminates the display panel PNL via the prism sheet PS and the diffusion sheet DS. That is, in the region of the second area A2, where the reflective layer P1 is not provided (or the region near the side surface YSF2), the light L1 from the side surface YSF2 is suppressed from being emitted from the light guide LG1 toward the display panel PNL.

Similarly, light L2 emitted from the light source LS2 is refracted by the side surface YSF3 and enters the light guide LG2. In the region of the first area A1, where the reflective layer P2 is not provided, the light L2 is repeatedly reflected by the main surface 2A and the opposing surface 2B, and travels within the light guide LG2. Of the light L2 traveling in the light guide LG2, the light L2 traveling from the light guide LG2 toward the reflective layer P2 is redirected in its travelling direction by the prisms in the reflective layer P2 and emitted from the main surface 2A without being in the state of the total reflection condition of the main surface 2A. The light emitted from the main surface 2A illuminates the display panel PNL via the light guide LG1, the prism sheet PS and the diffusion sheet DS. In other words, in the region of the first area A1, where the reflective layer P2 is not provided (or the region near the side surface YSF3), the light L2 from the side surface YSF3 is suppressed from being emitted from the light guide LG2 toward the display panel PNL.

The display panel PNL is illuminated in the first area A1 mainly by the light L1 from the light source LS1. The display panel PNL is illuminated in the second area A2 mainly by the light L2 from the light source LS2.

In general, light from a plurality of light sources (or light-emitting elements) arranged at intervals travels inside the light guide while diffusing, respectively, but these light portions do not mix sufficiently in the vicinity of the light sources (or the light-emitting elements). Therefore, in a display device that utilizes such light as illumination light, there is a risk that uneven luminance, which may appear as stripes or chromaticity shift due to the difference in intensity may be visually recognized when the display area is viewed in plan view. The difference in intensity of illumination light is reduced as the location is farther from the light source.

In the example illustrated in FIG. 3, in the region of the second area A2, where the reflective layer P1 is not provided, the light L1 entering from the side surface YSF2 is confined in the light guide LG1 and the entering of light to the display panel PNL is suppressed. In the second area A2, the light L1 from the light source LS1 hardly enters the display panel PNL, but the light L2 from the light source LS2 illuminates the display panel PNL. The first area A1 is remote from the side surface YSF2 by a distance sufficient for the portions of the light L1 to mix with each other. Thus, in the first area A1, the degradation of display quality (illumination quality), which may be caused by uneven luminance and chromaticity shift of the illumination light can be suppressed.

Similarly, in the region of the first area A1, where the reflective layer P2 is not provided, the light L2 entering from the side surface YSF3 is confined in the light guide LG2, and the entering of light to the display panel PNL is suppressed. In the first area A1, the light L2 from the light source LS2 hardly enters the display panel PNL, but the light L1 from the light source LS1 illuminates the display panel PNL. The second area A2 is remote from the side surface YSF3 by a distance sufficient for the portions of the light L2 to mix with each other. Thus, in the second area A2, the deterioration of display quality (illumination quality), which may be caused by uneven illumination light can be suppressed.

Further, the reflective layer P1 extends over the boundary BO to the second area A2 and the reflective layer P2 extends over the boundary BO to the first area A1. With this configuration, such a situation can be avoided that the luminance level of the light emitted from the illumination device IL decreases in the vicinity of the boundary BO. When the end portion E10 of the reflective layer P1 and the end portion E20 of the reflective layer P2 are each located at the boundary BO, the luminance level of the light emitted from the illumination device IL may decrease in the vicinity of the boundary BO.

Figure 4:
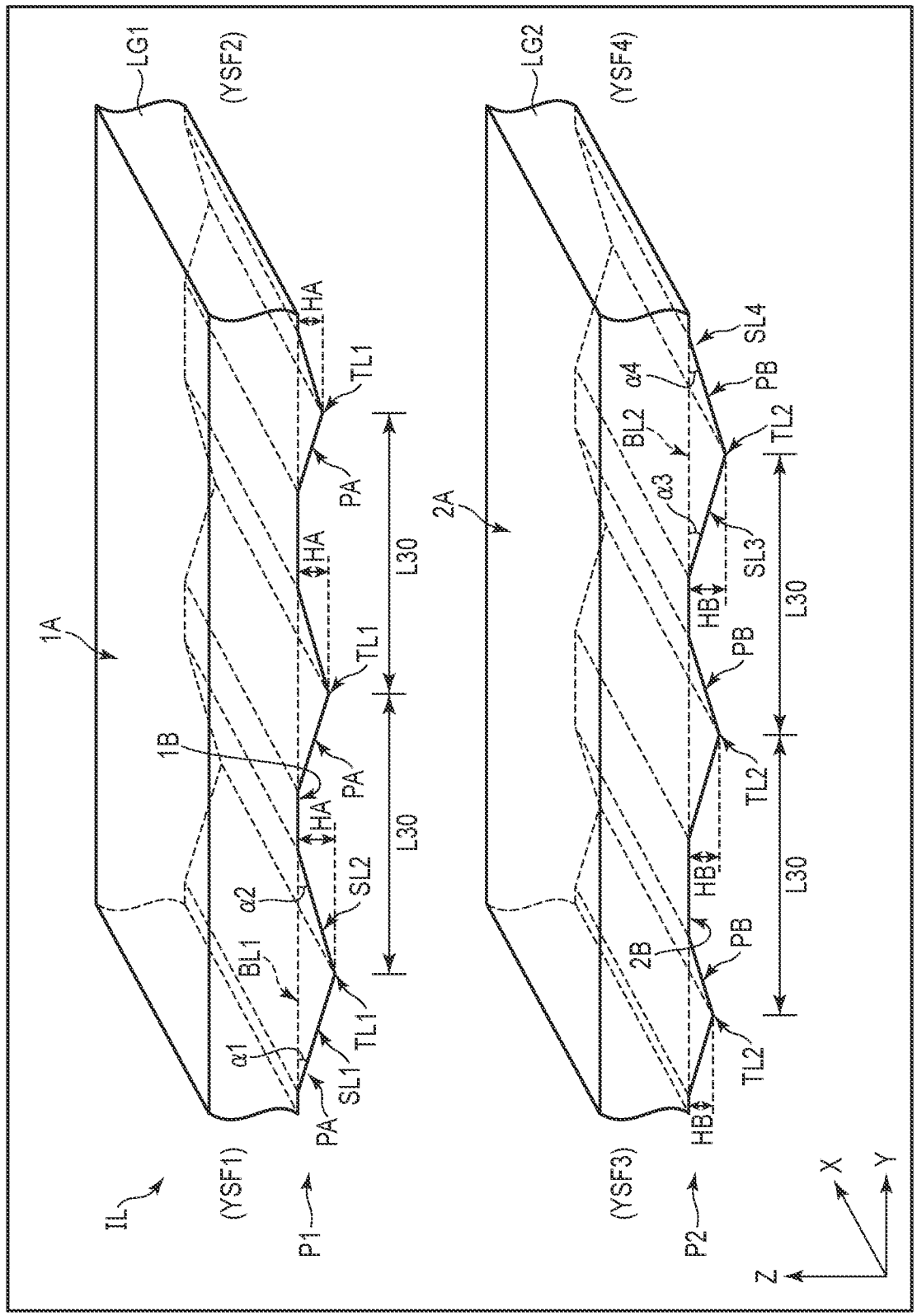
FIG. 4 is a perspective view showing the illumination device shown in FIG. 3, which illustrates a shape of a reflective layer.

FIG. 4 is a diagram illustrating the shapes of the reflective layers P1 and P2, which shows a perspective view of the illumination device IL in FIG. 3. FIG. 4 illustrates only a part of the light guide LG1, a part of the light guide LG2, a part of the reflective layer P1 and a part of the reflective layer P2 in the illumination device IL.

As shown in FIG. 4, the reflective layer P1 includes a plurality of prisms PA. The reflective layer P1 is constituted by the prisms PA intermittently aligned along the direction Y. The reflective layer P2 includes a plurality of prisms PB. The reflective layer P2 is constituted by the prisms PB intermittently aligned along the direction Y. The prisms PA are provided on the opposing surface 1B. The prisms PB are provided on the opposing surface 2B. For example, the prisms PA are formed to be integrated with the light guide LG1 as one body. Similarly, the prisms PB are formed to be integrated with the light guide LG2 as one body.

The prisms PA protrude from the opposing surface 1B toward the main surface 2A. The prisms PA have triangular shapes in cross-section parallel to the Y-Z plane and extend in the direction X. For example, the shapes of the prisms PA in their cross-sections parallel to the Y-Z plane are similar in relation to each other. The prisms PA each have a slope SL1 (first slope), a slope SL2 (second slope), a reference plane BL1, an intersection line TL1 and a height HA.

The Slope SL1 is located on a side surface YSF1 side and the slope SL2 is located on a side surface YSF2 side. The reference plane BL1 is located on the same plane as the main surface 1B. The intersection line TL1 is a line where the slope SL1 and the slope SL2 intersect each other.

The intersection lines TL1 are arranged at equal intervals L30 along the direction Y. The interval L30 is, for example, 0.1 mm. In the example illustrated, an angle α1 made between the slope SL1 and the reference plane BL1 is equal to an angle α2 made between the slope SL2 and the reference plane BL1. Note that the angle α1 corresponds to one of the interior angles in a cross-section of a prism PA, and the angle α2 corresponds to another one of the interior angles in the cross-section of the prism PA. The angle α1 and the angle α2 may as well be referred to as prism angles of the prism PA. The cross-section of the prisms PA is an isosceles triangle. The height HA is the height of the prism PA in the normal direction of the opposing surface 1B and corresponds to the length from the reference plane BL1 to the intersection line TL1 in the direction Z.

Among the plurality of prisms PA, the height HA decrease as the location of the prism PA approaches the side surface YSF2 from the side surface YSF1. In other words, the height HA of a prism PA is greater as the prism PA is farther from the light source LS1. As the location approaches from the end portion E10 towards the end portion E11, the proportion of the respective prism PA (the reference plane BL1) per unit area in the X-Y plane increases and the proportion of the respective main surface 1B per unit area in the X-Y plane decreases. On the other hand, when light traveling in the light guide LG1 progresses to the respective prism PA of the reflective layer P1 and is emitted from the light guide LG1, the amount of light traveling in the light guide LG1 decreases. In this manner, the illumination device IL can irradiate, in the first area A1, illumination light whose luminance distribution is uniform to the display panel PNL.

The prisms PB protrude to an opposite side of the main surface 2A from the opposing surface 2B in the direction Z. The prisms PBs have triangular shapes in cross-section parallel to the Y-Z plane and extend in the direction X. For example, the shapes of the prisms PB in their cross-sections parallel to the Y-Z plane are similar in relation to each other. The prisms PB each include a slope SL3 (third slope), a slope SL4 (fourth slope), a reference plane BL2, an intersection line TL2 and a height HB.

The slope SL3 is located on a side surface YSF3 side, and the slope SL4 is located on a side surface YSF4 side. The reference plane BL2 is located on the same plane as the opposing surface 2B. The intersection line TL2 is a line where the slope SL3 and the slope SL4 intersect each other.

The plurality of intersection lines TL2 are aligned at equal intervals L30 along the direction Y. In the example illustrated, an angle α3 made by the slope SL3 and the reference plane BL2 is equal to an angle α4 made by the slope SL4 and the reference plane BL2. Note that the angle α3 corresponds to one of interior angles in the cross-section of a prism PB, and the angle α4 corresponds to another one of the interior angles in the cross-section of the prism PB. The angle α3 and the angle α4 may as well be referred to as prism angles of the prism PB. The cross-section of the prism PB is an isosceles triangle. The height HB is the height of the respective prism PB in the direction normal to the opposing surface 2B and corresponds to the length from the reference plane BL2 to the intersection line TL2 in the direction Z.

Among the plurality of prisms PB, the height HB decrease as the location of the prism PB approaches the side surface YSF4 from the side surface YSF3. In other words, the height HB of a prism PB is greater as the prism PB is farther from the light source LS2. As the location approaches from the side surface YSF4 to the side surface YSF3, the proportion of the respective prism PB (the reference plane BL2) per unit area in the X-Y plane decreases and the proportion of the respective opposing surface 2B per unit area in the X-Y plane increases. On the other hand, when light traveling in the light guide LG2 progresses to the respective prism PB of the reflective layer P2 and is emitted from the light guide LG2, the amount of light traveling in the light guide LG2 decreases. In this manner, the illumination device IL can irradiate, in the second area A2, illumination light whose luminance distribution is uniform to the display panel PNL.

Figure 5:
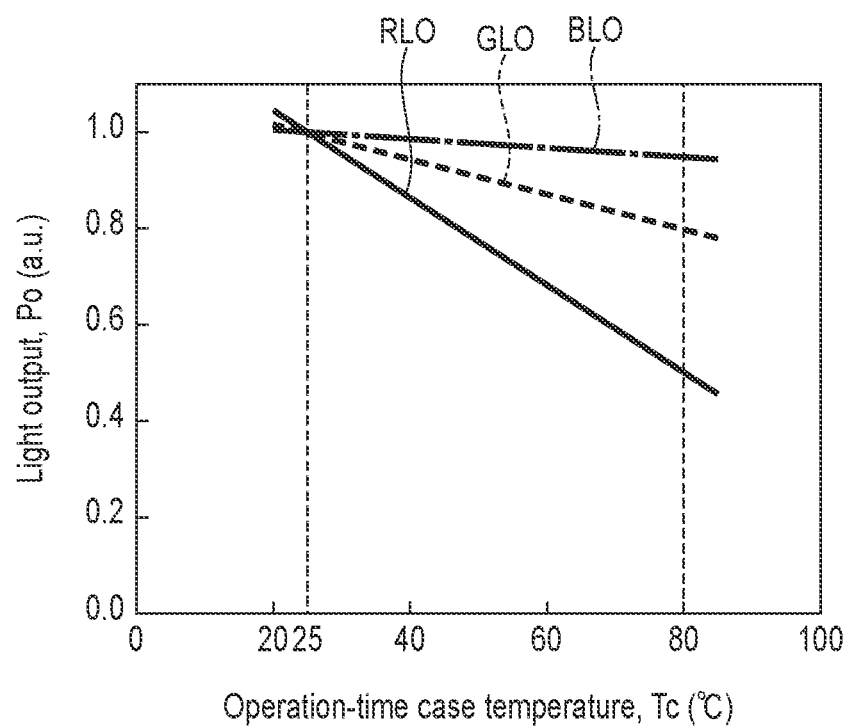
FIG. 5 is a schematic diagram showing an example of a change in light output of a diode caused by temperature drift of the diode.

FIG. 5 is a schematic diagram showing an example of the change in light output of a diode due to temperature drift of the diode. In FIG. 5, the horizontal axis indicates the temperature Tc (° C.) of the case of the display device DSP and the illumination device IL during the operation (which may be referred to as the operation-time case temperature, hereinafter) and the vertical axis indicates the light output Po (a.u.) of the diode. FIG. 5 shows a change RLO in light output with respect to the operation-time case temperature due to temperature drift of the diode emitting red light (which may as well be referred to as a red diode, hereinafter) (the change may as well be referred to as the change in light output of the red diode to temperature, hereinafter), a change GLO in light output with respect to the operation-time case temperature due to temperature drift of the diode emitting green light (which may as well be referred to as a green diode, hereinafter) (the change may as well be referred to as the change in light output of the green diode to temperature, hereinafter), and a change BLO in light output with respect to the operation-time case temperature due to temperature drift of the diode emitting blue light (which may as well be referred to as a blue diode, hereinafter) (the change may as well be referred to as the change in light output of the blue diode to temperature, hereinafter). In FIG. 5, the operation-time case temperature at the start of operation of the display device DSP and the illumination device IL immediately after lighting (which may as well be referred to as "operation start temperature" hereinafter) is 25° C., and the temperature at which the operation of the display device DSP and the illumination device IL stabilizes or saturates after lighting (which may as well be referred to as "operation saturation temperature" hereinafter) is 80° C. Note that the operation start temperature may as well be some temperature other than 25° C. The operation saturation temperature may as well be some temperature other than 80° C.

In the example illustrated in FIG. 5, the changes in light output, RLO, GLO and BLO of the red diode, green diode and blue diode, respectively, with respect to temperature decrease as the operation-time case temperature increases. In other words, the light outputs of the red diode, green diode and blue diode, respectively decrease as the operation-time case temperatures increases. The light output of the red diode decreases significantly as the operation-time case temperature increases, as compared to the light outputs of the green diode and blue diode.

For example, when white-color mixing (or white color adjusting) is carried out by additive color mixing in the light sources LS1 and LS2, in each of which a red diode, a green diode and a blue diode constitute a combination (white color mixing), the light outputs of the green diode and the blue diode need to be reduced to match the light output of the red diode, which is greatly reduced as the operation-time case temperature increases, and therefore the brightness (or luminance) may decrease.

Figure 6:
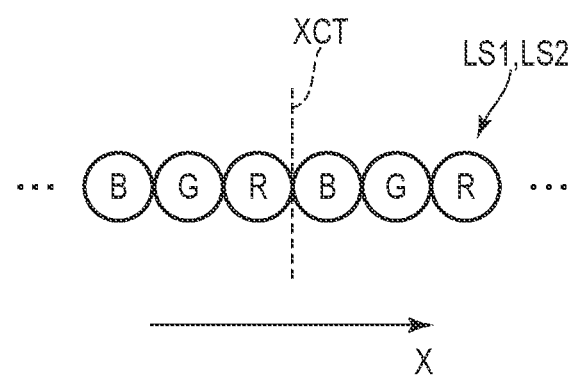
FIG. 6 is a schematic view showing a configuration example of a light source in a comparative example.

FIG. 6 is a schematic diagram showing an example of the configuration of light sources LS1 and LS2 in a comparative example. The tip of the arrow in the direction X may be opposite to the direction shown in FIG. 6.

In the example illustrated in FIG. 6, the light sources LS1 and LS2 are each constituted as a combination of a red light emitting element (R), a green light emitting element (G), and a blue light emitting element (B). For example, the light sources LS1 and LS2 each include an even number of light emitting elements. In FIG. 6, the light sources LS1 and LS2 are two combinations of red light emitting elements (R), green light emitting elements (G), and blue light emitting elements (B) arranged in the described order, symmetrically (which may as well be referred to as center-symmetrical hereinafter) with respect to the central axis XCT. For example, in the light sources LS1 and LS2, multiple combinations of red light emitting elements (R), green light emitting elements (G) and blue light emitting elements (B) arranged in the described order are repeatedly disposed along the side surfaces YSF2 and YSF3$m$ respectively. In the example illustrated in FIG. 6, two combinations of blue light emitting elements (B), green light emitting elements (G), and red light emitting elements (R) respectively arranged in the described order on the tip side of the arrow in direction X are arranged to be center-symmetrical with respect to the central axis XCT.

FIG. 7 is a diagram showing an example of a table of parameters of the red light emitting elements (R), green light emitting elements (G) and blue light emitting elements (B) in the case of white color mixing at the operation saturation temperature in the configuration of the light sources LS1 and LS2 according to the comparison example illustrated in FIG. 6. The table in FIG. 7 corresponds to the light sources LS1 and LS2 in FIG. 6.

The table in FIG. 7 includes items of the dominant wavelength ($\lambda$D), the radiation amount of light output (Po), the light output (photometric amount) of one light emitting element of each color (which may as well be referred to as the single light output, hereinafter) (Fo), the number of light emitting elements of each color, the saturation temperature coefficient for calculating the light output of light-emitting elements of each color that varies with temperature, for example, the operation-time case temperature, the light output obtained by multiplying a total of the light outputs of all the light-emitting elements of each color (which may as well be referred to as the total light output of colors hereinafter) by the saturation temperature coefficient (which may as well be referred to as the total saturated color light output, hereinafter) (Fo), and the general color mixing ratio of the colors (for example, red, green and blue) when white color mixing is carried out by the additive color mixing (which may as well be referred to as the white color mixing ratio, hereinafter), and the light output (which may as well be referred to as the adjusted total color light output, hereinafter) obtained by adjusting the light output, for example, the total saturated color light output, of the light emitting elements of each color by, for example, the magnitude of the current applied to the light emitting elements of each other so as to make the ratio of the total saturated color light output matches or approximates the white color mixing ratio, and the total light output obtained by summing up the adjusted total light outputs of the light emitting elements of all the colors. Here, the color total light output of light emitting elements of each color corresponds to the product of the single light output of light emitting elements of each color and the number of light emitting elements of the respective color.

The single light output Fo of the light emitting elements of each color is calculated by the following Formula (1).

$$Fo = Km \times \int Po(\lambda) V(\lambda) d\lambda \qquad \text{(Formula (1))}$$

where $\lambda$ is 380 to 780 μm, and Km is 683 lm/W (lumen/Watt).

In the example illustrated in FIG. 7, the average luminance L of the display device DSP and the illumination device IL is represented by: L=8.6509×10$^4$ (cd/m$^2$). For example, the average chromaticity CIE x (red-blue locus) and the average chromaticity CIE y (green-blue locus) of the display device DSP and illumination device IL, which are perfectly white when white mixing, are each 0.33. In the example illustrated in FIG. 7, the average chromaticity CIE x of the display device DSP and the illumination device IL when white mixing is 0.31507, and the average chromaticity CIE y of the display device DSP and the illumination device IL when white mixing is 0.32813. The input power P of the display device DSP and the illumination device IL in FIG. 7 is 12.45 (W) (P=12.45 (W)). The input power of the red light emitting elements (R) of the display device DSP and the illumination device IL in FIG. 7 is obtained by: 810 (mA)× 2.0 (V)×2=3.24 (W). The input power of the green light emitting elements (G) of the display device DSP and the illumination device IL in FIG. 7 is obtained by: 400 (mA)× 4.2 (V)×2=3.36 (W). The input power of the blue light emitting elements (B) of the display device DSP and the illumination device IL in FIG. 7 is obtained by: 680 (mA)× 4.3 (V)×2=5.85 (W). The emission efficiency L/P of the display device DSP and illumination device IL of FIG. 7 is: L/P=6948 (cd/m$^2$/W)=402.2 (lm/P)=32.3 (lm/W).

As shown in FIG. 7, when white color mixing is carried out at the operation saturation temperature in the configurations of the light sources LS1 and LS2 of the comparison example illustrated in FIG. 6, the total saturated color light output of the red light emitting element at the operation saturation temperature due to temperature drift is small, and therefore, in order to match or approximate the white color mixing ratio, the total saturated color light outputs of the green light emitting elements and the blue light emitting elements may need to be significantly lowered.

Meanwhile, when white color mixing is carried out at the operation saturation temperature in the configurations of the light sources LS1 and LS2 shown in FIGS. 6 and 7, color breakup may occur in the display device DSP and the illumination device IL because the light emitting elements of the colors are unevenly arranged.

Figure 8:
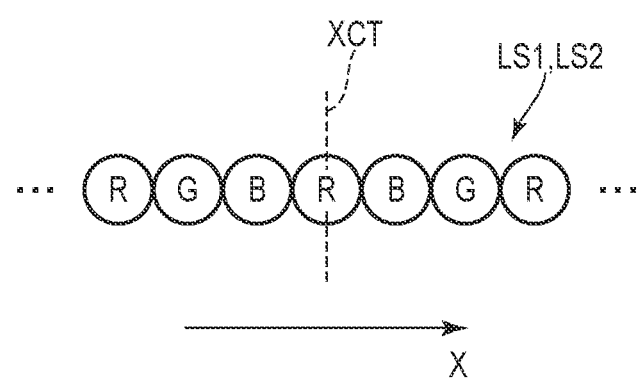
FIG. 8 is a schematic view showing a configuration example of the light source according to the embodiment.

FIG. 8 is a schematic diagram showing an example of the configurations of the light sources LS1 and LS2 according to this embodiment. Note that the tip of the arrow in the direction X may be opposite to the direction shown in FIG. 8.

In this embodiment, the light sources LS1 and LS2 each include an odd number of light emitting elements. For example, the light sources LS1 and LS2 are each constituted by an even number of combinations of red light emitting elements (R), green light emitting elements (G) and blue light emitting elements (B) arranged in the described order, and one red light emitting element (R). For example, the light sources LS1 and LS2 are configured with a structure different from the structure in which a plurality of combinations of red light emitting elements (R), green light emitting elements (G) and blue light emitting elements (B) arranged in the described order are repeatedly disposed along the side surfaces YSF2 and YSF3, respectively. In the light sources LS1 and LS2, an odd number of light emitting elements are arranged to be center-symmetrical with respect to the central axis XCT. In the light sources LS1 and LS2, the light emitting elements of each color are arranged to be center-symmetrical with respect to the central axis XCT. For example, in the light sources LS1 and LS2, a plurality of red light emitting elements are arranged to be center-symmetrical with respect to the central axis XCT, a plurality of green light emitting elements are arranged to be center-symmetrical with respect to the central axis XCT, and a plurality of blue light emitting elements are arranged to be center-symmetrical with respect to the central axis XCT.

In the example illustrated in FIG. 8, in the light sources LS1 and LS2, a red light emitting element (R) is placed on the central axis XCT, and a blue light emitting element (B), a green light emitting element (G) and a red light emitting element (R) are disposed in the mentioned order on the tip side of the arrow in the direction X of the red light emitting element (R) placed on the central axis XCT, and a blue light emitting elements (B), a green light emitting element (G) and a red light emitting element (R) are arranged in the order on the opposite side of the tip of the arrow in the direction X of the red light emitting element (R) located on the central axis XCT. In other words, the light sources LS1 and LS2 each include a red light emitting element (R) disposed on the central axis XCT, a blue light emitting element (B) adjacent to the red light emitting element (R) located on the central axis XCT on to the tip side of the arrow in the direction X, a green light emitting element (G) adjacent to this blue light emitting element (B) on the tip side of the arrow in the direction X, a red light emitting element (R) adjacent to this green light emitting element (G) on the tip side of the arrow in the direction X, a blue light emitting element (B) adjacent the red light emitting element (R) located on the central axis XCT on an opposite side to the tip side of the arrow in the direction X, a green light emitting element (G) adjacent to this blue light emitting element (B) on an opposite side to the tip side of the arrow in the direction X, and a red light emitting element (R) adjacent to this green light emitting element (G) on an opposite side to the tip side of the arrow in the direction X. For example, in the light sources LS1 and LS2, red light emitting elements (R), green light emitting elements (G) and blue light emitting elements (B) may as well be disposed along the side surfaces YSF2 and YSF3, respectively, to maintain the arrangement and the number ratio among the red light emitting elements (R), green light emitting elements (G) and blue light emitting elements (B) shown in FIG. 8. Note that in FIG. 8, the green light emitting elements (G) and the blue light emitting elements (B) may as well be disposed to be replaced with each other.

FIG. 9 is a diagram showing an example of a table of parameters of the red light emitting elements, green light emitting elements and blue light emitting elements in the case of white color mixing at the operation saturation temperature in the configurations of the light sources LS1 and LS2 according to this embodiment shown in FIG. 8. The table in FIG. 9 corresponds to the light sources LS1 and LS2 in FIG. 8.

The table in FIG. 9 indicates items of the single light output (photometric amount) (Fo) of the light emitting elements of each color, the number of light emitting elements of each color, the saturation temperature coefficient of the light emitting elements of each color, the total color light output (Fo) of the light emitting elements of each color, the saturated total color light output (Fo) of the light emitting elements of each color, the white color mixing ratio of the light emitting elements of each color, the light output ratio, which is the ratio among the saturated color light outputs of the light-emitting elements of the colors, the adjusted total color light output obtained by adjusting the total saturated color light output of the light-emitting elements of each color by the magnitude of the current applied to the light-emitting elements of each color so that the ratio among the total saturated color light outputs of the light-emitting elements of the colors matches or approximates the white color mixing ratio.

In the example illustrated in FIG. 9, the average luminance L of the display device DSP and the illumination device IL is: L=1.25413×10$^5$ (cd/m$^2$). In the example illustrated in FIG. 9, the average chromaticity CIE x of the display device DSP and the illumination device IL when white mixing is 0.32416, and the average chromaticity CIE y of the display device DSP and the illumination device IL when white mixing is 0.32566.

As shown in FIG. 9, when white color mixing is carried out at the operation saturation temperature in the configurations of the light sources LS1 and LS2 shown in FIG. 8, the light output of the red light emitting elements at the operation saturation temperature drops significantly due to temperature drift. Therefore, in order for the light output ratio of the red (R) light emitting elements, green (G) light emitting elements and blue (B) light emitting elements to match or approximate the white color mixing ratio, it may become necessary to reduce the total saturated color light outputs of the green light emitting elements and blue light emitting elements by adjusting the magnitude of the current applied to the green light emitting elements and blue light emitting elements, respectively. The amount of decrease in light output, for example, total color light output, of the green light emitting elements and the blue light emitting elements in the configurations of the light sources LS1 and LS2 shown in FIGS. 8 and 9 is smaller than the amount of decrease in light output, for example, total color light output, of the green light emitting element and the blue light emitting element in the configurations of the light sources LS1 and LS2 shown in FIGS. 6 and 7. The total light output of the display device DSP and the illumination device IL in the case of white color mixing at the operation saturation temperature in the configurations of the light sources LS1 and LS2 shown in FIGS. 8 and 9 is larger than the total light output of the display device DSP and the illumination device IL in the case of white color mixing at the operation saturation temperature in the configurations of the light sources LS1 and LS2 shown in FIGS. 6 and 7.

In the case of white color mixing at the operation saturation temperature in the configuration of light sources LS1 and LS2 shown in FIGS. 8 and 9, color breakup cannot occur in the display device DSP and the illumination device IL, because the light emitting elements of the colors of the light sources LS1 and LS2 are arranged to be center-symmetrical with respect to the central axis XCT.

Figure 10:
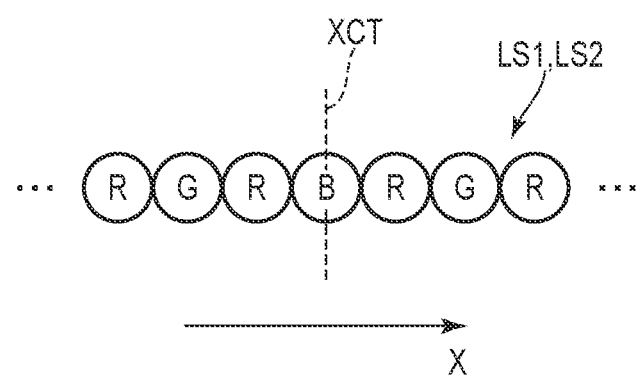
FIG. 10 is a schematic diagram showing a configuration example of e of a light source in accordance with the embodiment.

FIG. 10 is a schematic diagram showing an example of the configurations of the light sources LS1 and LS2 according to the embodiment. Note that the tip of the arrow in the direction X may be opposite to the direction shown in FIG. 10.

In the light sources LS1 and LS2, the number of light emitting elements of each color is set or optimized so that the ratio of light output among the light emitting elements of the colors at the operation saturation temperature, that is, for example, the light output ratio of the light emitting elements of each color matches or approximates the white color mixing ratio, and the sum of the number of light emitting elements of each color is an odd number.

In the light sources LS1 and LS2, the number of red light emitting elements (R), that of green light emitting elements (G) and that of blue light emitting elements (B) are set or optimized so that the ratio among the light outputs of the red light emitting elements (R), the green light emitting elements (G) and the blue light emitting elements (B) at the operation saturation temperature, that is, for example, the light output ratio among the red light emitting elements (R), the green light emitting elements (G) and the blue light emitting elements (B) matches or approximates to the white color mixing ratio, and the sum of the red light emitting elements (R), the green light emitting elements (G) and the blue light emitting elements (B) is an odd number.

In the light sources LS1 and LS2, the odd number of red light emitting elements (R), that of green light emitting elements (G) and that of blue light emitting elements (B) are determined or optimized based on the Formula (2), Formula (3), or Formula (4) provided below, so that the light output ratio among the green light emitting elements (G) and blue light emitting elements (B) at the operation saturation temperature matches or approximates the white color mixing ratio and the sum of the number of red light emitting elements (R), green light emitting elements (G) and blue light emitting elements (B) becomes an odd number.

The relationship between the ratio among the total saturated color light outputs of the red light emitting elements (R), green light emitting elements (G) and blue light emitting elements (B) at the operation saturation temperature and the white color mixing ratio is expressed by Formula (2) below.

$$WR:WG:WB = FR \times DR \times NR : FG \times DG \times NG : FB \times DB \times NB \quad \text{(Formula (2))}$$

Here, WR represents the ratio of the total color output of the red light emitting elements when white color is created by additive color mixing, and it is, for example, 1. WG represents the ratio of the total color output of the green light emitting elements when white is created by additive color mixing, and it is, for example, 7. WB represents the ratio of the total color output of the blue light emitting elements when white color is created by additive color mixing and it is, for example, 3. NR is the number of red light emitting elements (R), NG is the number of green light emitting elements (G), and NB is the number of blue light emitting elements (B). DR is the saturation temperature coefficient (temperature drift coefficient) of the red light emitting elements (R), DG is the saturation temperature coefficient (temperature drift coefficient) of the green light emitting elements (G), and DB is the saturation temperature coefficient (temperature drift coefficient) of the blue light emitting elements (B). FR is the single light output of the red light emitting elements (R), FG is the single light output of the green light emitting elements (G), and FB is the single light output of the blue light emitting elements (B).

The number of the red light emitting elements (R), the number of the green light emitting elements (G) and the number of the blue light emitting elements (B) based on Formula (2) can be set based on Formula (3) or Formula (4) below.

$$NR:NG:NB = \frac{WR}{FR \times DR} : \frac{WG}{FG \times DG} : \frac{WB}{FB \times DB} \quad \text{(Formula (3))}$$

$$NR:NG:NB \approx \frac{WR}{FR \times DR} : \frac{WG}{FG \times DG} : \frac{WB}{FB \times DB} \quad \text{(Formula (4))}$$

NR, NG, and NB are set respectively to be integers where NR+NG+NR is an odd number and which satisfy Formula (3) or Formula (4). NR, NG and NB can be selectively set to respective integers where NR+NG+NR is an odd number and which are close to numerical values that satisfy Formula (3) or Formula (4). For example, NR, NG and NB can be selectively set to respective integers where NR+NG+NR is an odd number and which are closest to numerical values that satisfy Formula (3) or Formula (4). In other words, NR, NG and NB are selectively set to respective integers where NR+NG+NR is an odd number and which are closest to numerical values that satisfy Formula (3) or Formula (4).

In the example illustrated in FIG. 10, in the light sources LS1 and LS2, a blue light emitting element (B) is disposed on the central axis XCT, and a red light emitting element (R), a green light emitting element (G) and a red light emitting element (R) are disposed in the order on the tip side of the arrow in the direction X of the blue light emitting element (B) disposed on the central axis XCT, and a red light emitting element (R), a green light emitting element (G) and a red light emitting element (R) are disposed in the order on an opposite side to the tip side of the arrow in the direction X of the blue light emitting element (B) disposed on the central axis XCT. In other words, the light sources LS1 and LS2 each include a blue light emitting element (B) disposed on the central axis XCT, a red light emitting element (R) adjacent to the blue light emitting element (B) located on the central axis XCT on the tip side of the arrow of the direction X, a green light emitting element (G) adjacent to this red light emitting element (R) on the tip side of the arrow of the direction X, a red light emitting element (R) adjacent to this green light emitting element (G) on the tip side of the arrow in the direction X, a red light emitting element (R) adjacent to the blue light emitting element (B) disposed on the central axis XCT on an opposite side to the tip side of the arrow in the direction X, a green light emitting element (G) adjacent to this red light emitting element (R) on an opposite side to the tip side of the arrow in the direction X, and a red light emitting element (R) adjacent to this green light emitting element (G) on an opposite side to the tip side of the arrow in the direction X. For example, in the light sources LS1 and LS2, red light emitting elements (R), green light emitting elements (G) and blue light emitting elements (B) may be disposed along the side surfaces YSF2 and YSF3, respectively, so as to maintain the arrangement of and the number ratio among the red light emitting elements (R), green light emitting elements (G) and blue light emitting elements (B) shown in FIG. 10. Note that in FIG. 10, the green light emitting elements (G) and the blue light emitting elements (B) may be arranged in replace with each other.

FIG. 11 is a diagram showing an example of a table of the parameters of the red light emitting elements, green light emitting elements and blue light emitting elements in the case of white color mixing at the operation saturation temperature in the configurations of the light sources LS1 and LS2 according to this embodiment shown in FIG. 10. The table in FIG. 11 corresponds to the light sources LS1 and LS2 shown in FIG. 10.

The table in FIG. 11 indicates the light output (photometric value) (Fo) of one light emitting element of each color, the number of light emitting elements of each color, the saturation temperature coefficient of the light emitting elements of each color, the color total light output (Fo) of the light emitting elements of each color, the total saturated color light output (Fo) of the light emitting elements of each color, the white color mixing ratio of the light emitting elements of each color, the light output ratio of the light-emitting elements of each color, the adjusted total light output obtained by adjusting the total saturated color light outputs of the light-emitting elements of each color by the magnitude of the current applied to each light-emitting element so that the ratio of the total saturated color light output of the light-emitting elements of each color matches or approximates the white color mixing ratio, and the total light output.

In the example illustrated in FIG. 11, the average luminance L of the display device DSP or the illumination device IL is: $L=1.68196 \times 10^5$ (cd/m$^2$). In the example illustrated in FIG. 11, the average chromaticity CIE x of the display device DSP and the illumination device IL when white mixing is 0.32525, and the average chromaticity CIE y of the display device DSP and the illumination device IL when white mixing is 0.32367. The input power P of the display device DSP and the illumination device IL shown in FIG. 11 is: P=21.06 (W). The input power of the red light emitting elements (R) of the display device DSP and the illumination device IL of FIG. 11 is: 810 (mA)×2.0 (V)×4=6.48 (W). The input power of the green light emitting elements (G) of the display device DSP and the illumination device IL of FIG. 11 is: 1000 (mA)×4.3 (V)×2=8.60 (W). The input power of the blue light emitting elements (B) of the display device DSP and the illumination device IL of FIG. 11 is: 1300 (mA)×4.6 (V)×1=5.98 (W). The emission efficiency L/P of the display device DSP and the illumination device IL of FIG. 11 is: L/P=7986 (cd/m$^2$/W)=802.7 (lm/P)=38.1 (lm/W).

As shown in FIG. 11, when white color mixing is carried out at the operation saturation temperature in the configurations of the light sources LS1 and LS2 shown in FIG. 10, only the total saturated color light output of the green light emitting elements (G) need to be reduced by adjusting the magnitude of the current applied to the green light emitting element so that the light output ratios among the red light emitting elements (R), green light emitting elements (G) and blue light emitting elements (B) matches or approximates the white color mixing ratio. The amount of decrease in the total saturated color light output of the green light emitting elements (G) in the configurations of the light sources LS1 and LS2 shown in FIGS. 10 and 11 is smaller than the amount of decrease in the total saturated color light output of the green light emitting elements (G) in the configurations of the light sources LS1 and LS2 shown in FIGS. 8 and 9. The total light output of the display device DSP or the illumination device IL in the case of white color mixing at the operation saturation temperature in the configurations of the light sources LS1 and LS2 shown in FIGS. 10 and 11 is greater than the total light output of the display device DSP or the illumination device IL in the case of white color mixing at the operation saturation temperature in the configurations of the light sources LS1 and LS2 shown in FIGS. 8 and 9.

In the case of white color mixing at the operation saturation temperature in the configurations of the light sources LS1 and LS2 shown in FIGS. 10 and 11, color breakup cannot occur in the display device DSP or the illumination device IL because the light emitting elements of each color of the light sources LS1 and LS2 are arranged to be center-symmetrical with respect to the central axis XCT.

According to the embodiment, the illumination device IL includes the light sources LS1 and LS2 containing an odd number of light emitting elements arranged to be center-symmetrical with respect to the central axis XCT in the direction X. In the light sources LS1 and LS2, the light emitting elements of each color are arranged to be symmetrical with respect to the central axis XCT. In the light sources LS1 and LS2, the number of light emitting elements of each color is optimized so that the light output ratio among the light emitting elements of the colors matches or approximates the white color mixing ratio and the sum of the numbers of the light emitting elements of each color is an odd number. For example, in the light sources LS1 and LS2, the number of red light emitting elements, that of green light emitting elements and that of blue light emitting elements are optimized so that the ratio among the total saturated color light outputs of the red light emitting elements, green light emitting elements and blue light emitting elements matches or approximates 3:7:1. Thus, the illumination device IL can increase the light output without creating color breakup. Therefore, the illumination device IL can improve the uniformity of the white chromaticity distribution and enhance the light output in white color mixing. That is, the display device DSP as well can improve the uniformity of white chromaticity distribution and enhance light output when white color mixing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An illumination device comprising:
a first light guide including a first side surface, a second side surface located on an opposite side to the first side surface in a first direction, a first main surface, and a first opposing surface located on an opposite side to the first main surface in a second direction intersecting the first direction;
red light emitting elements, green light emitting elements and blue light emitting elements opposing the first side surface, wherein
the first light guide plate has a first area emitting a light from the first main surface, and a second area where the light travels through total reflection inside the light guide plate,
the red light emitting elements, the green light emitting elements and the blue light emitting elements are disposed along the first side surface in a third direction that intersects the first direction and the second direction, and arranged to be symmetrical with respect to a central axis of the third direction of the first side surface, and
the red light emitting elements, the green light emitting elements and the blue light emitting elements are laser diodes.

2. The illumination device according to claim 1, wherein the number of the red light emitting elements, the number of the green light emitting elements and the number of the blue light emitting elements are set so that a ratio among a first light output of all the red light emitting elements, a second light output of all the green light emitting elements and a third light output of all the blue light emitting elements matches or approximate a color mixing ratio at which white color is created by additive color mixing, and the number of red light emitting elements, the number of green light emitting elements and the number of blue light emitting elements are odd numbers.

3. The illumination device according to claim 1, wherein the number NR of red light emitting elements, the number NG of green light emitting elements and the number NB of blue light emitting elements are set based on the following Formula (1):

$$NR:NG:NB = \frac{WR}{FR \times DR} : \frac{WG}{FG \times DG} : \frac{WB}{FB \times DB} \quad \text{(Formula (1))}$$

where the WR represents the ratio of the light output of the red light emitting elements when white is created by additive color mixing, the WG represents the ratio of the light output of the green light emitting elements when white is created by additive color mixing, the WB represents the ratio of the light output of the blue light emitting elements when white is created by additive color mixing, the DR represents a coefficient for calculating the light output of the red light emitting elements, that varies with temperature, the DG represents a coefficient for calculating the light output of the green light emitting elements, that varies with temperature, the DB represents a coefficient for calculating the light output of the blue light emitting elements, that varies with temperature, the FR represents the light output of one of the red light emitting elements, the FG represents the light output of one of the green light emitting elements, and the FB represents the light output of one of the blue light emitting elements.

4. The illumination device according to claim 3, wherein the number NR of red light emitting elements, the number NG of green light emitting elements and the number NB of blue light emitting elements are each set to an integer closest to a value satisfied by the Formula (1) among integers by which a sum of the NR, the NG, and the NB is an odd number.

5. The illumination device according to claim 4, wherein the WR is 3, the WG is 7, and the WB is 1.

6. The illumination device according to claim 1, wherein the red light emitting elements include a first red light emitting element, a second red light emitting element, a third red light emitting element and a fourth red light emitting element, the green light emitting elements include a first green light emitting element and a second green light emitting element, the blue light emitting elements include a first blue light emitting element, and the first blue light emitting element is disposed on the central axis, the first red light emitting element is disposed adjacent to the first blue light emitting element in the third direction, the first green light emitting element is disposed adjacent to the first red light emitting element in the third direction, the second red light emitting element is disposed adjacent to the first green light emitting element in the third direction, the third red light emitting element is disposed adjacent to the first blue light emitting element in a fourth direction opposite to the third direction, the second green light emitting element is disposed adjacent to the third red light emitting element in the fourth direction, and the fourth red light emitting element is disposed adjacent to the second green light emitting element in the fourth direction.

7. The illumination device according to claim 1, wherein the red light emitting elements include a first red light emitting element, a second red light emitting element and a third red light emitting element, the green light emitting elements include a first green light emitting element and a second green light emitting element, and the blue light emitting elements include a first blue light emitting element and a second blue light emitting element, and the first red light emitting element is disposed on the central axis, the first blue light emitting element is disposed adjacent to the first red light emitting element in the third direction, the first green light emitting element is disposed adjacent to the first blue light emitting element in the third direction, the second red light emitting element is disposed adjacent to the first green light emitting element in the third direction, the second blue light emitting element is disposed adjacent to the first red light emitting element in a fourth direction opposite to the third direction, the second green light emitting element is disposed adjacent to the second blue light emitting element in the fourth direction, and the third red light emitting element is disposed adjacent to the second green light emitting element in the fourth direction.

8. A display device comprising:
an illumination device; and
a display panel for displaying images,
the illumination device comprising:
a first light guide including a first side surface, a second side surface located on an opposite side to the first side surface in a first direction, a first main surface, and a first opposing surface located on an opposite side to the first main surface in a second direction intersecting the first direction, and
red light emitting elements, green light emitting elements and blue light emitting elements opposing the first side surface, wherein
the first light guide plate has a first area emitting a light from the first main surface, and a second area where the light travels through total reflection inside the light guide plate,
the red light emitting elements, the green light emitting elements and the blue light emitting elements are disposed along the first side surface in a third direction that intersects the first direction and the second direction, and arranged to be symmetrical with respect to a central axis of the third direction of the first side surface,
the display panel opposing the first main surface, and
the red light emitting elements, the green light emitting elements and the blue light emitting elements are laser diodes.

9. The display device according to claim 8, wherein the number of the red light emitting elements, the number of the green light emitting elements and the number of the blue light emitting elements are set so that a ratio among a first light output of all the red light emitting elements, a second light output of all the green light emitting elements and a third light output of all the blue light emitting elements matches or approximate a color mixing ratio at which white color is created by additive color mixing and the number of red light emitting elements, the number of green light emitting elements and the number of blue light emitting elements are odd numbers.

10. The display device according to claim 8, wherein the number NR of red light emitting elements, the number NG of green light emitting elements and the number NB of blue light emitting elements are set based on the following Formula (1):

$$NR: NG: NB = \frac{WR}{FR \times DR} : \frac{WG}{FG \times DG} : \frac{WB}{FB \times DB} \quad \text{(Formula (1))}$$

where the WR represents the ratio of the light output of the red light emitting elements when white is created by additive color mixing, the WG represents the ratio of the light output of the green light emitting elements when white is created by additive color mixing, the WB represents the ratio of the light output of the blue light emitting elements when white is created by additive color mixing, the DR represents a coefficient for calculating the light output of the red light emitting elements, that varies with temperature, the DG represents a coefficient for calculating the light output of the green light emitting elements, that varies with temperature, the DB represents a coefficient for calculating the light output of the blue light emitting elements, that varies with temperature, the FR represents the light output of one of the red light emitting elements, the FG represents the light output of one of the green light emitting elements, and the FB represents the light output of one of the blue light emitting elements.

11. The display device according to claim 10, wherein the number NR of red light emitting elements, the number NG of green light emitting elements and the number NB of blue light emitting elements are each set to an integer closest to a value satisfied by the Formula (1) among integers by which a sum of the NR, the NG, and the NB is an odd number.

12. The display device according to claim 11, wherein the WR is 3, the WG is 7, and the WB is 1.

13. The display device according to claim 8, wherein the red light emitting elements include a first red light emitting element, a second red light emitting element, a third red light emitting element and a fourth red light emitting element, the green light emitting elements include a first green light emitting element and a second green light emitting element, the blue light emitting elements include a first blue light emitting element, and the first blue light emitting element is disposed on the central axis, the first red light emitting element is disposed adjacent to the first blue light emitting element in the third direction, the first green light emitting element is disposed adjacent to the first red light emitting element in the third direction, the second red light emitting element is disposed adjacent to the first green light emitting element in the third direction, the third red light emitting element is disposed adjacent to the first blue light emitting element in a fourth direction opposite to the third direction, the second green light emitting element is disposed adjacent to the third red light emitting element in the fourth direction, and the fourth red light emitting element is disposed adjacent to the second green light emitting element in the fourth direction.

14. The display device according to claim 8, wherein the red light emitting elements include a first red light emitting element, a second red light emitting element and a third red light emitting element, the green light emitting elements include a first green light emitting element and a second green light emitting element, and the blue light emitting elements include a first blue light emitting element and a second blue light emitting element, and the first red light emitting element is disposed on the central axis, the first blue light emitting element is disposed adjacent to the first red light emitting element in the third direction, the first green light emitting element is disposed adjacent to the first blue light emitting element in the third direction, the second red light emitting element is disposed adjacent to the first green light emitting element in the third direction, the second blue light emitting element is disposed adjacent to the first red light emitting element in a fourth direction opposite to the third direction, the second green light emitting element is disposed adjacent to the second blue light emitting element in the fourth direction, and the third red light emitting element is disposed adjacent to the second green light emitting element in the fourth direction.

\* \* \* \* \*